United States Patent [19]

Denckert

[11] Patent Number: 4,492,419

[45] Date of Patent: Jan. 8, 1985

[54] ELECTRIC DISTRIBUTION CENTER

[76] Inventor: Lennart H. Denckert, Sörgården 125, Danderyd, Sweden, S-186 00

[21] Appl. No.: 342,088

[22] Filed: Jan. 25, 1982

Related U.S. Application Data

[63] Continuation of Ser. No. 91,203, Nov. 7, 1979, abandoned.

[51] Int. Cl.$^3$ .............................................. H01R 9/04
[52] U.S. Cl. .............................. 339/18 C; 339/147 R
[58] Field of Search ............... 339/18 C, 18 P, 147 R, 339/198 R

[56] References Cited

U.S. PATENT DOCUMENTS

| | | | |
|---|---|---|---|
| 872,670 | 12/1907 | McWilliams | 339/18 C |
| 1,736,028 | 11/1929 | Winklehaus | 339/198 R |
| 3,252,056 | 5/1966 | Poesl | 339/18 C |

*Primary Examiner*—Joseph H. McGlynn
*Attorney, Agent, or Firm*—Holman & Stern

[57] ABSTRACT

An electric distribution center is built up from a desired number of corresponding modular elements, each element including cross-wisely slidable electrical conductors (7) which can be inserted into an adjacent element, and by means of a force applying member (22) be brought into mechanical and electrical contact with a conductor (6, 6', 6") in said adjacent element. All conductors (6, 6', 6") in each element, apart from those joining the fuses (18, 18', 18") with a terminal block (16) for a power consuming group are arranged as laminations electrically insulated from each other and against contact. The conductors (17, 17', 17") from the fuses to the terminal block (16) for consuming devices are wires having helical end portions adjacent to the fuses (18, 18', 18"), thus forming an attachment thread for fuse covers (3, 3', 3") associated with each electrical fuse (18, 18', 18").

12 Claims, 7 Drawing Figures

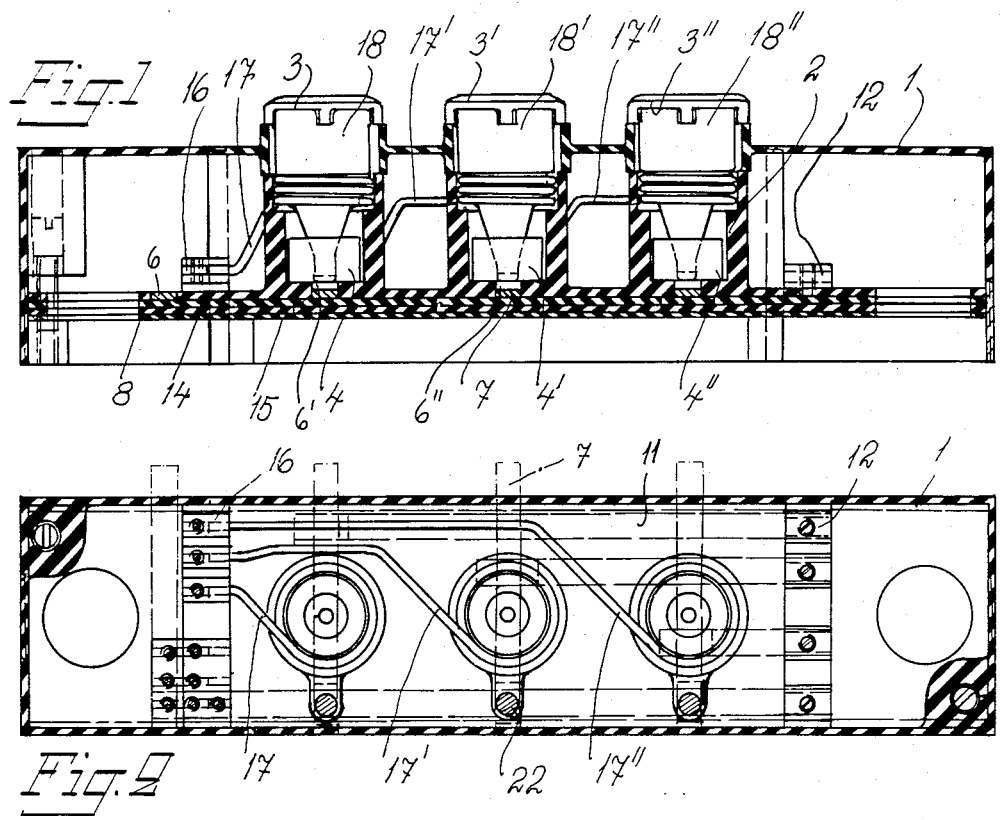
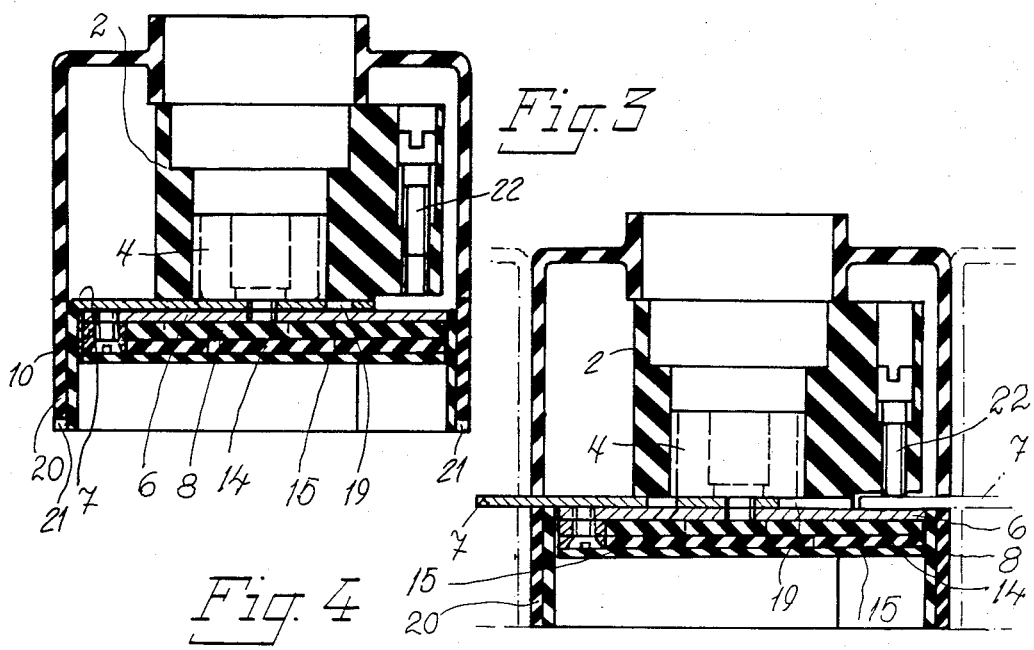

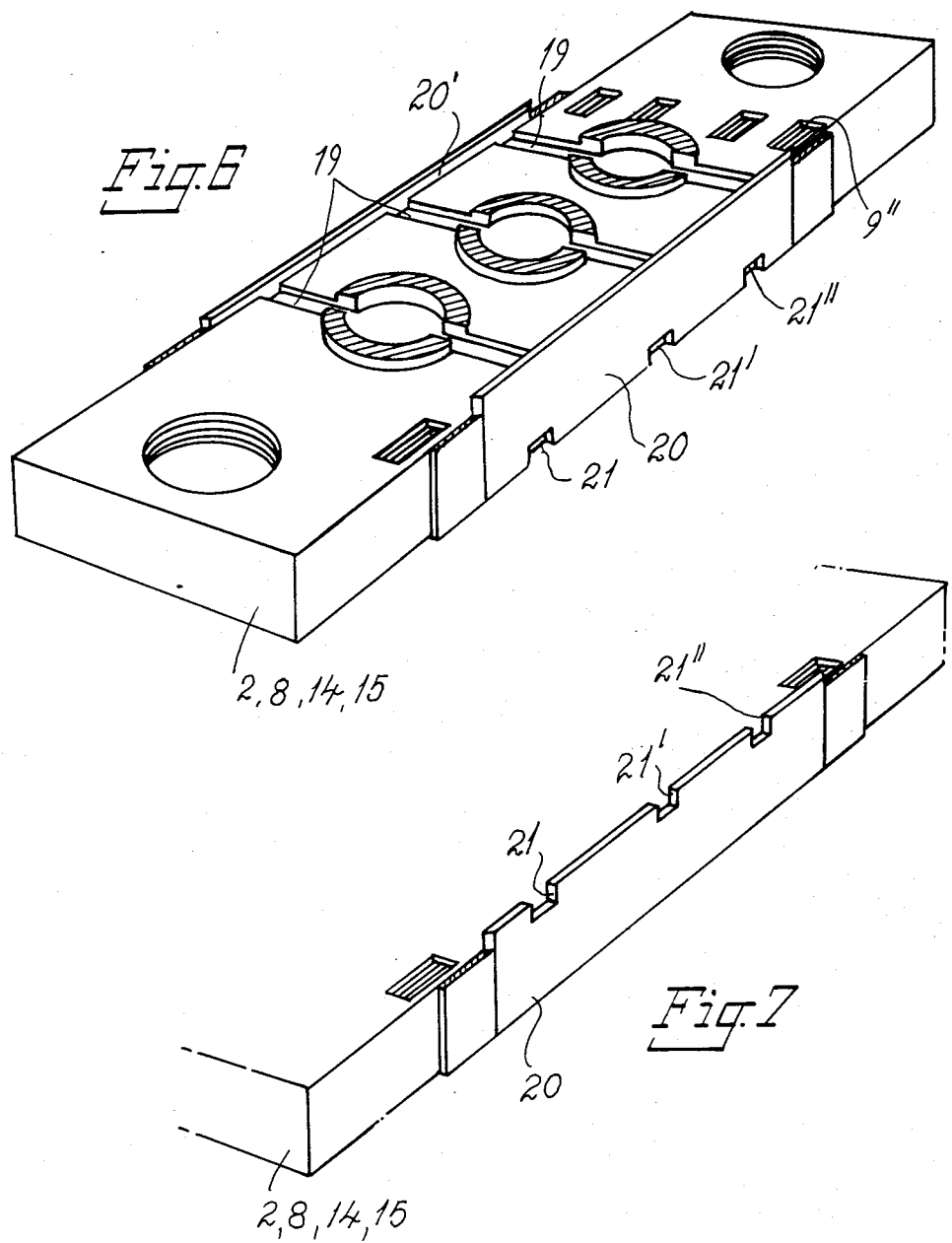

ELECTRIC DISTRIBUTION CENTER

This is a continuation of application Ser. No. 091,203, filed Nov. 7, 1979, now abandoned.

The present invention relates to an electric distribution center of the type that includes at least one row of fuse elements, e.g. three fuses, or a number of such rows, each row being a fused connection between incoming electrical wires and a number, or a group, of consuming devices, e.g. light sources, electrical heat sources, or other similar devices.

Commonly used types of electric distribution centers are manufactured and marketed in a large number of types, e.g. including one, three, five, ten, fifteen or twenty rows of fuses, and a suitable size is chosen at the time of installation for the size of installation. If, at a later point of time, the number of consuming units is to be increased, a further distribution center is usually connected, normally adjacent to the first center.

The above type of distribution centers can thus not be arranged to match the exact number of consumers, i.e. at initial installation a standard size is chosen, which as near as possible corresponds to desired number of fuse points. Subsequent increase of this number, which can not be included in the first distribution center, one or more centers are mounted adjacent to the first center.

In order to accomplish more flexible electrical distribution centers, attempts have previously been made to disclose modular electrical distribution centers, e.g. as shown in DE-AS No. 1 240 971, which shows a design including a number of separate fuse elements, for example arranged in three rows, above the other. The elements are held in position between two side pieces through which a number of substantially U-shaped profiles extend, the number corresponding to the number of fuse rows, and intended to embrace an electrical conductor against which respective rows of fuse elements are arranged in electrical contact. Each fuse element also includes connecting means, by which a certain group of consuming devices can be connected. However, this design does not facilitate expansion in a simple manner, since both the current transporting members and embracing profiles must be exchanged for longer units, and since the protective cover used for the distribution center also must be exchanged for a cover matching the size of the extended center.

Examples of prior art devices are also shown in DE-AS No. 1 070 718 and DE-AS No. 1 074 698, which both disclose how individual fuse elements can be attached to a common profile. However, these embodiments do not in any way meet the regulations relating to electric distribution centers; rather, they merely indicate that "modular thinking" has existed earlier, and that attempts have been made to disclose suitable solutions.

The object of the present invention is to provide an electric distribution center, based on a desired number of identical modular elements, said elements forming an extremely well-designed electric distribution center. Since the distribution center is built up using only one type of element, the end product is extremely inexpensive, and at a later stage of time, its size can be reduced or increased, as desired. The modular elements of the distribution center can also be easily exchanged if faulty and the electrician only needs to use one type of unit, both for exchange purposes and for extensions. The design makes it also possible to provide electrical connections for a specific group, without any need for breaking the power for all groups included in the distribution center.

A preferred embodiment of an electric distribution center according to the present invention is more fully described below, reference being made to the accompanying drawings.

FIG. 1 is a longitudinal sectional view through a modular element, utilized to achieve an electric distribution center according to the present invention.

FIG. 2 is a front view of the modular element shown in FIG. 1, with the surrounding protective housing in cross-section.

FIG. 3 is a cross-sectional view of a schematically shown modular element according to the present invention, when utilized as a simple unit, or a terminating unit at a distribution center including a number of modular elements.

FIG. 4 is a view corresponding to FIG. 3, but with the modular element arranged as an intermediate element between two corresponding modular elements (only indicated).

FIG. 6 is a perspective view of the base of a modular element, showing same arranged with co-operating members, which prevent connection with an adjacent element.

FIG. 7 is a fragmentary perspective view corresponding to FIG. 6, said cooperating members being arranged to facilitate connection with an adjacent element.

Figure 5:
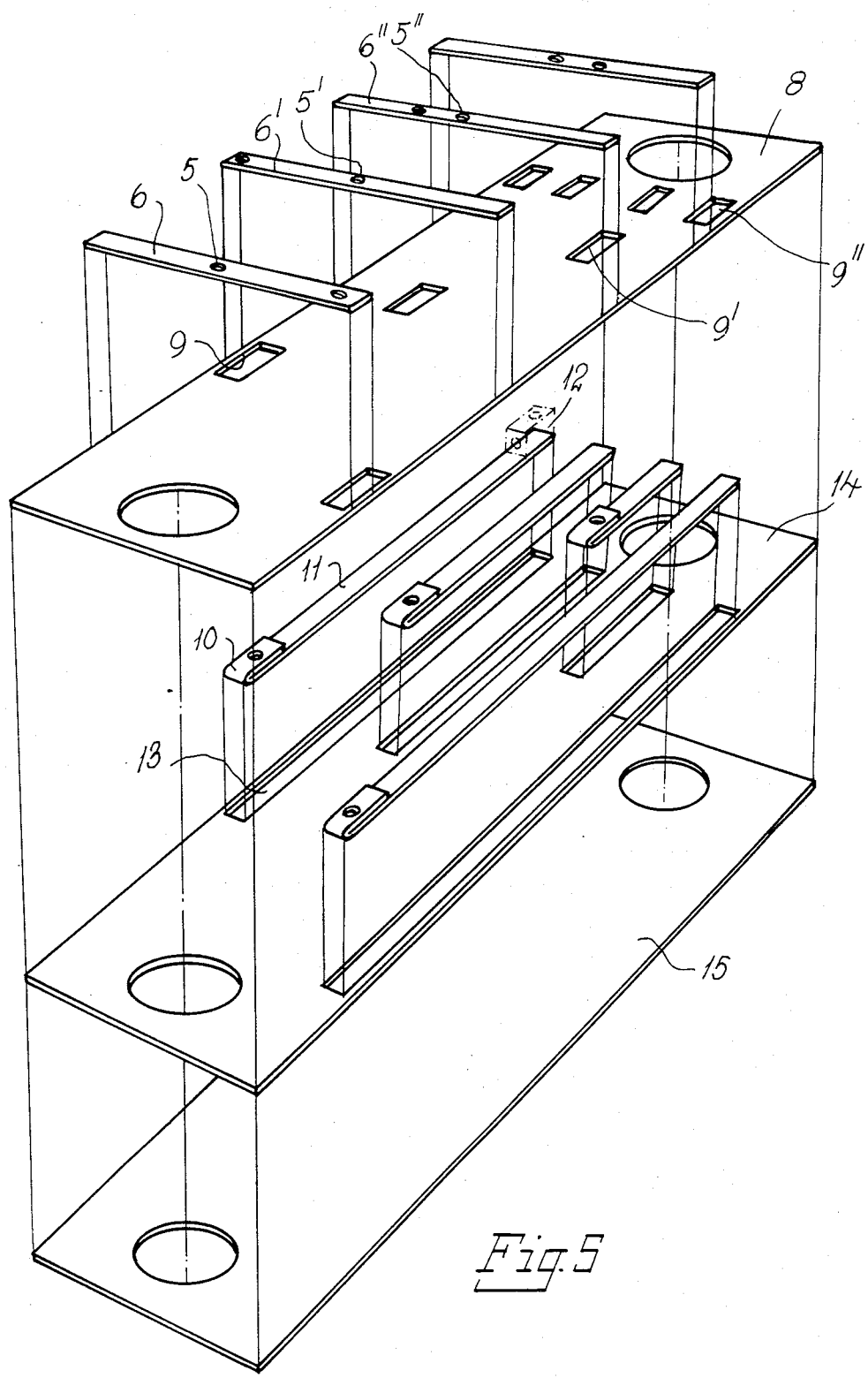
FIG. 5 is a schematical and exploded view of the base of a modular element showing the arrangement of associated electrical conductors.

An electric distribution center according to the present invention is built up to desired size utilizing modular elements of one type only. With reference to FIGS. 1 and 2 such a modular element is shown and includes a surrounding housing 1, which surrounds a first mainly flat base member 2 including three mainly tubular parts extending in a direction towards the outer surface of the housing 1. Opposed to each tubular part there is a tubular member arranged in the housing 1, intended to facilitate insertion of a fuse cover 3, 3', 3" of conventional type. In each tubular part of base member 2, a conventional bottom member 4, 4', 4" can be attached by screwing its threaded stud into a threaded hole 5, 5', 5" in a lower conductor 6, 6', 6". The threaded stud extends through a hole with clearance, arranged in a second conductor 7, arranged intermediately between the conductors 6, 6', 6" and the base members 4, 4', 4".

Said first or lower conductors 6, 6', 6" are, as shown in FIG. 5, arranged in contact with a first thin insulating member 8 having a number of recesses 9, 9', 9" through which a folded end portion 10 of conductors 11 extends under insulating member 8 and through which members 12 attached to the conductors 11 also extend. Said conductors 11 are arranged in grooves 13 in a second thin insulating member 14, and a third thin insulating member 15 is arrranged in contact with the second thin member 14.

As shown in FIGS. 1 and 2, a terminal block 16 is arranged at the first thin insulating member 8 and has three wire conductors, 17, 17', 17" extending therefrom into the tubular part at the base member 2 through grooves arranged in the tubular parts. The free end portions of said wire conductors 17, 17', 17" are arranged with a helical shape, thus forming a screw thread to which the fuse covers 3, 3', 3" can be connected, thereby forming, via an embraced electrical fuse member 18, 18', 18", an electric circuit from the conductor 10 over the conductors 6, 6', 6" to conductors 7, interconnecting the aforementioned conductors 6, 6', 6" with the terminal block 16.

Previously mentioned members 12 attached to the conductors 11 are utilized as connection means for incoming electrical power which, in the above described manner via the fuses 18, 18', 18", is transferred to the terminal block 16 to which the wires of consuming devices are connected.

As shown in the figures, the thin and electrically insulating members, 8, 14 and 15 respectively, are arranged with through holes at the outer end portions, which holes faciliate insertion of wires intended to be connected to the terminal block 16 or the members 12.

FIG. 6 shows an assembled unit comprising the insulating thin member 8, 14, 15 and the base member 2, the tubular parts of the base member 2 being only partly shown. A number of grooves 19, 19', 19", are shown extending crosswisely over the base member 2, intended to surround a conductor 7 (not shown in this figure). At each side of said unit, a cover 20, 20' is slidably attached in such a manner, that it can be removed from the unit. Covers 20, 20' include, in this embodiment, three grooves 21, 21', 21" at the lower edge portion. The housing 1 used for the unit is arranged at each side with a recess, whereby the covers 20, 20' form a part of the outer wall portion of the housing when housing 1 is attached.

When only one modular element is to be utilized, as shown in FIG. 3, the above mentioned covers 20, 20' are arranged in the way shown in FIG. 6, i.e. closing the grooves 19, 19', 19". Each bottom member 4, 4', 4" adjacent to the conductors 7 is arranged as shown in FIG. 3, i.e. with the threaded attachment studs of the bottom members 4, 4', 4" extending through a first hole in the conductor 7, attached to the threaded holes 5, 5', 5" in the lower conductors 6, 6', 6". Incoming wires are connected to the members 12, which are attached to the conductors 10, whereas outgoing wires are connected to the terminal block 16. Thus a fuse unit is provided to faciliate connection of one electric group only.

When a number of electrical consuming group are to be connected, either when increasing the size of the above described unit or during initial installation, the modular elements are utilized as follows.

The surrounding housing 1 is removed, thus making it possible to remove related covers 20, 20'. These are removed and turned in such a way that the recesses 21, 21', 21" correspond with the grooves 19, 19', 19". The bottom members 4, 4', 4" are not attached or removed. Adjacent to each tubular part in the base member 2, a screw 22 is attached by means of a screw thread in such a way that screw 22 can be screwed down towards the grooves 19, 19', 19". The conductors 7 located in said grooves 19, 19', 19" are slid into grooves 19, 19', 19" in such a way that they protrude in the same direction from the groove 19, 19', 19" through the recesses 21, 21', 21". Conductors 7 also include a second hole with clearance, through which the threaded side of the bottom members 4, 4', 4" can extend when the bottom members 4, 4', 4" are attached within the tubular part of the base member 2. With reference to FIG. 4, it is shown how adjacent modular elements are connected. The protruding conductors 7 are inserted through the recesses 21, 21', 21" in an adjacent modular element. Co-acting screws 22 are tightend, thereby locking the modular elements in a united position and also establishing an electrical circuit from inserted conductors 7 to existing conductors 6, 6', 6" in the modular element while establishing an extremely good electrical contact. Since the slidable conductors 7 have a length shorter than the surrounding grooves 19, 19', 19", the connection can also be terminated after the desired number of modular elements are joined, by not moving the conductors 7 of the last element past adjacent cover 20, 20' which is left in the position shown in FIG. 6. The cover at the first modular element is also left in a corresponding position, whereby the outer element has full wall portions, eliminating the risk for injuries due to contact with related slidable conductors 7.

The method in which the attachment thread for the fuse covers 3, 3', 3" has been arranged faciliates a simple and, from manufacturing point favorable design; in addition the fuse covers 3, 3', 3" have extremely desirable attachment properties, both from mechanical and electrical point of view, since said properties are only further improved as more the fuse covers 3, 3', 3" are screwed in.

When utilizing a number of modular elements, united in the described manner, incoming wires are obviously normally attached to one modular element only by means of the attachment members 12.

The present invention thus makes it possible to build up electric distribution centers of desired size with the use of only one type of modular element and provides the possibility at a later point of time to increase or reduce the capacity of the installed unit as desired. Another important aspect of this invention is the possibility making connections, with full safety against risks for injury, if a housing 1 is removed with related electrical fuses 18, 18', 18", the power to other modular elements can remain since there is no risk of unintentional contact with conductors carrying electrical current. These are completely protected by means of the base member 2 and previously mentioned thin electrical insulating members 8, 14, 15.

The present invention also makes it possible to achieve simplified and inexpensive service. Faults related to individual modular elements can easily be repaired since service men only need to utilize an exchange system with a corresponding type of elements, which also reduces the stock of spare parts. The cost for future extensions of an electric distribution center is also reduced, since it can easily be built out step-by-step by attachment of the desired number of modular elements. There are also advantages from a manufacturing point of view, since only one type of surrounding housing 1 need be manufactured for any size of distribution center. The use of the wire conductors 17, 17', 17" as attachment threads for the fuse covers 3, 3', 3" is a further cost-reducing step, which, as previously mentioned, also has advantages with regard to mechanical and electrical properties.

The embodiment shown and described is only intended to serve as an example of an embodiment within the scope of the present invention, since further modifications can be made, maintaining the characteristic features disclosed in the following claims.

I claim:

1. An electrical distribution center of the type in which at least one fuse element is adapted to be electrically connected to incoming and outgoing electrical wires and wherein plural such fuse elements are adapted to be positioned in adjacent relation, each fuse element comprising:

a support member having a defined periphery;

plural spaced grooves defined in and extending across said support member;

plural slidable conductors, each positioned for longitudinally slidable movement in respective one of said plural grooves, said slidable conductors each having a length which is shorter than the length of said grooves and having an underside facing into said respective grooves;

plural stationary conductors, one for each slidable conductors, each disposed in slidable contact with the underside of a respective slidable conductor;

wherein said slidable conductors are each slidable to a position in its respective groove wherein the slidable conductor extends beyond the periphery of said support member and into a groove of a support member of a fuse element positioned adjacent said each fuse element; and adjustable securing means for selectively pressing said slidable conductors into secure mechanical and electrical contact with said stationary conductors.

2. An electrical distribution center according to claim 1, further comprising:

plural further conductors equal in number to said stationary conductors and extending substantially cross-wise to said stationary conductors, each further conductor having first and second end portions;

first means disposed at said first end portion of each further conductor for providing electrical contacts between that further conductor and a respective stationary conductor;

second means disposed at said second end portion of each further conductor for providing electrical contact between that further conductor and a respective incoming electrical wire; and first and second thin electrically insulating members;

wherein said further conductors are disposed between said insulating members, said first insulating member having plural holes defined therethrough and through which said first and second means project.

3. An electrical distribution center according to claims 1 or 2, further including:

an outer housing member disposed atop said support member and including two opposed removable side panels positioned adjacent respective ends of said slidable conductors, each side panel having recesses therein; and means securing said panels to said housing member in first and second alternative positions such that in said first position, the side panels seal respective ends of said grooves and in said second position, said recesses are aligned with said grooves to permit said slidable conductors to project beyond and through said recesses.

4. The electrical distribution center according to claims 1 or 2, wherein the length of said slidable conductors is sufficiently short relative to the groove in which it slides that it can remain entirely within that groove when a slidable conductor from an adjacent fuse element projects partially into that groove.

5. An electrical distribution center according to claims 1 or 2, wherein said support member comprises a substantially flat base member extending across the stationary conductors and having substantially tubular members extending from said stationary conductors, and further comprising:

plural helically wound wires surrounded by respective ones of said tubular members, each wound wire having a free end;

a terminal block for connection of wires to power consumption devices;

means connecting said free end of each would wire to said terminal block; and a plurality of threaded fuse covers adapted to threadedly engage said helically wound wires in respective tubular members.

6. The electrical distribution center according to claim 5, wherein said adjustable securing means comprises a screw member positioned adjacent each tubular member and arranged to apply an adjustable force against a respective slidable conductor to force that slidable conductor into electrical contact with a respective stationary conductor.

7. An electrical distribution center according to claims 1 or 2, further including:

plural fuse mounting means secured to said support member, each fuse mounting means arranged to engage an electrical fuse holder having a threaded attachment stud;

wherein said slidable conductors have first and second spaced clearance holes defined therethrough of sufficient size to permit said threaded attachment stud to project therethrough, said clearance holes being located such that when said stud projects through said first hole, the slidable conductors is disposed entirely within the periphery of said support member, and where said stud projects through said second hole, said slidable conductor projects beyond the periphery of said support member.

8. The electrical distribution center according to claim 7, wherein said stationary conductors have further holes defined therethrough to receive said threaded attachment stud extending through one of said clearance holes in said slidable conductor.

9. An electrical distribution center according to claim 2, further comprising:

a third thin insulating member disposed intermediate said first and second insulating members and having plural further grooves defined therein; and wherein said further conductors are disposed in respective ones of said further grooves.

10. The electrical distribution center according to claim 9, wherein said first, second and third thin insulating members have openings defined therethrough for facilitating insertion of said incoming and outgoing wires in said fuse elements.

11. An electrical distribution center of the type in which at least one fuse element is adapted to be electrically connected to incoming and outgoing electrical wires and wherein plural fuse elements are adapted to be positioned in adjacent relation, each fuse element comprising:

a support member having a defined periphery and a support surface;

plural spaced grooves defined in and extending transversely entirely across said support surface, said grooves having generally rectangular transverse cross-sections;

plural slidable conductors having rectangular transverse cross-sections slightly smaller than the rectangular cross-section of said grooves, each slidable conductor being positioned within a respective groove for slidable movement therein transversely of said support surface, said slidable conductors each having a length which is shorter than the length of said grooves and an underside facing into the grooves in which the slidable conductor is positioned;

plural stationary conductors, one for each slidable conductor, each stationary conductor being disposed in slidable contact with the underside of a respective slidable conductor and extending transversely of said support surface to a length greater than the length of said slidable conductors;

wherein said slidable conductors are each slidable to a position in its respective groove wherein the slidable conductor extends transversely beyond the periphery of said support member and into a groove of a support member of a fuse element positioned transversely adjacent each said fuse element;

adjustable securing means for receiving respective further conductors slidably extended transversely from and beyond grooves in a support member of an adjacent fuse element and selectively pressing received further conductors into secure mechanical and electrical contact with said stationary conductors; and plural fuse holder means, each including an electrically conductive base member having means for selectively engaging said stationary and slidable conductors in secure electrical and mechanical contact.

12. An electrical distribution panel comprising:

a support member having defined length and width dimensions;

plural fuse holder elements secured to and spaced lengthwise along said support member;

plural input power receiving terminal disposed proximate one end of said support member;

plural spaced grooves defined in and extending transversely across the entire support member, wherein each of said fuse holder elements overlay a portion of a respective groove;

plural slidable conductors, each positioned for longitudinally slidable movement in a respective one of said plural grooves, said slidable conductors each having a length which is shorter than the length of said grooves and having an underside facing into said respective grooves;

plural stationary conductors, one for each slidable conductor, each disposed in contact with the underside of a respective slidable conductor, each stationary conductor having a dimension along said grooves which is greater than the length of said slidable conductors;

wherein said slidable conductors are each slidable into a position in its respective groove wherein the slidable conductor extends transversely beyond the periphery of said support member and into a support member of a fuse element positioned adjacent each fuse element; and adjustable securing means for receiving respective further conductors slidably extended transversely from and beyond grooves in a support member of an adjacent fuse element and selectively pressing the received further conductors into secure mechanical and electrical contact with said stationary conductors.

* * * * *